(12) United States Patent
Steinfort

(10) Patent No.: US 10,383,312 B2
(45) Date of Patent: Aug. 20, 2019

(54) ANIMAL TAG

(71) Applicant: ENDURO TAGS PTY LTD, Lilydale (AU)

(72) Inventor: John James Steinfort, Warragul (AU)

(73) Assignee: ENDURO TAGS PTY LTD, Victoria (AU)

( * ) Notice: Subject to any disclaimer, the term of this patent is extended or adjusted under 35 U.S.C. 154(b) by 0 days.

(21) Appl. No.: 15/568,825

(22) PCT Filed: Apr. 22, 2016

(86) PCT No.: PCT/AU2016/000138
§ 371 (c)(1),
(2) Date: Oct. 24, 2017

(87) PCT Pub. No.: WO2016/168886
PCT Pub. Date: Oct. 27, 2016

(65) Prior Publication Data
US 2018/0098522 A1    Apr. 12, 2018

(30) Foreign Application Priority Data
Apr. 24, 2015   (AU) ................................ 2015901469

(51) Int. Cl.
*G09F 3/00*       (2006.01)
*A01K 11/00*      (2006.01)
(Continued)

(52) U.S. Cl.
CPC .......... *A01K 11/004* (2013.01); *A01K 11/001* (2013.01); *G09F 3/02* (2013.01); *G09F 3/12* (2013.01)

(58) Field of Classification Search
CPC ............................ A01K 11/001; A01K 11/004
(Continued)

(56) References Cited

U.S. PATENT DOCUMENTS 3,260,007 A * 7/1966 Hayes ................. A01K 11/001
                                                      40/301
3,731,414 A * 5/1973 Murphy .............. A01K 11/001
                                                      40/301
(Continued)

FOREIGN PATENT DOCUMENTS

AU    2010227050 A1    4/2011
EP       0123506 A2   10/1984
WO    1996004783 A1    2/1996

OTHER PUBLICATIONS

International Search Report and Written Opinion, Enduro Tags Pty Ltd, WO 2016/16886, PCT/AU2016/000138 (international filing date Apr. 22, 2016).

*Primary Examiner* — Shin H Kim
(74) *Attorney, Agent, or Firm* — Wayne Edward Ramage; Baker Donelson

(57) ABSTRACT

Tag apparatus for attachment to the ear of an animal including a male member with a stem and a penetrating head for penetrating the ear; a portion that abuts against the hack of the ear and cannot be pulled out of the ear, said portion having an end that is not directed towards the head of the animal when the apparatus is fitted to the ear; such that when the apparatus is fitted to the ear, the apparatus has no overhanging material on which the animal can entangle the tag apparatus on a structure.

17 Claims, 11 Drawing Sheets

(51) Int. Cl.
*G09F 3/02* (2006.01)
*G09F 3/12* (2006.01)

(58) Field of Classification Search
USPC .................................................. 40/301, 302
See application file for complete search history.

(56) References Cited

U.S. PATENT DOCUMENTS

| | | | |
|---|---|---|---|
| 4,359,015 A | 11/1982 | Ritchey | |
| 4,581,834 A * | 4/1986 | Zatkos | A01K 11/001 119/655 |
| 4,597,208 A | 7/1986 | Chevillot | |
| 4,748,757 A * | 6/1988 | Howe | A01K 11/001 40/301 |
| 4,878,302 A | 11/1989 | Jowsey | |
| D325,268 S * | 4/1992 | Wittick | D30/155 |
| 5,228,224 A * | 7/1993 | Gardner | A01K 11/001 40/301 |
| 6,385,877 B1 * | 5/2002 | Wikan | A01K 11/001 40/300 |
| 6,546,652 B1 * | 4/2003 | Gardner | A01K 11/001 119/655 |
| 6,666,170 B1 * | 12/2003 | Hilpert | A01K 11/001 119/814 |
| 7,533,482 B2 | 5/2009 | Huenefeld | |
| 7,690,141 B2 * | 4/2010 | Steinfort | A01K 11/004 119/655 |
| 8,573,502 B2 | 11/2013 | McCoy | |
| 8,695,244 B2 * | 4/2014 | Eadie | A01K 11/002 119/651 |
| 8,985,059 B2 * | 3/2015 | Kellerby | A01K 13/003 119/655 |
| 9,192,143 B2 * | 11/2015 | Hilpert | A01K 11/001 |
| 2004/0079010 A1 * | 4/2004 | Crespo | A01K 11/004 40/301 |
| 2004/0103567 A1 * | 6/2004 | Destoumieux | A01K 11/003 40/301 |
| 2008/0250682 A1 * | 10/2008 | Costantini | A01K 11/001 40/301 |
| 2012/0030977 A1 * | 2/2012 | Knapp | A01K 11/001 40/301 |
| 2012/0285056 A1 | 11/2012 | Corrales, Jr. | |

* cited by examiner

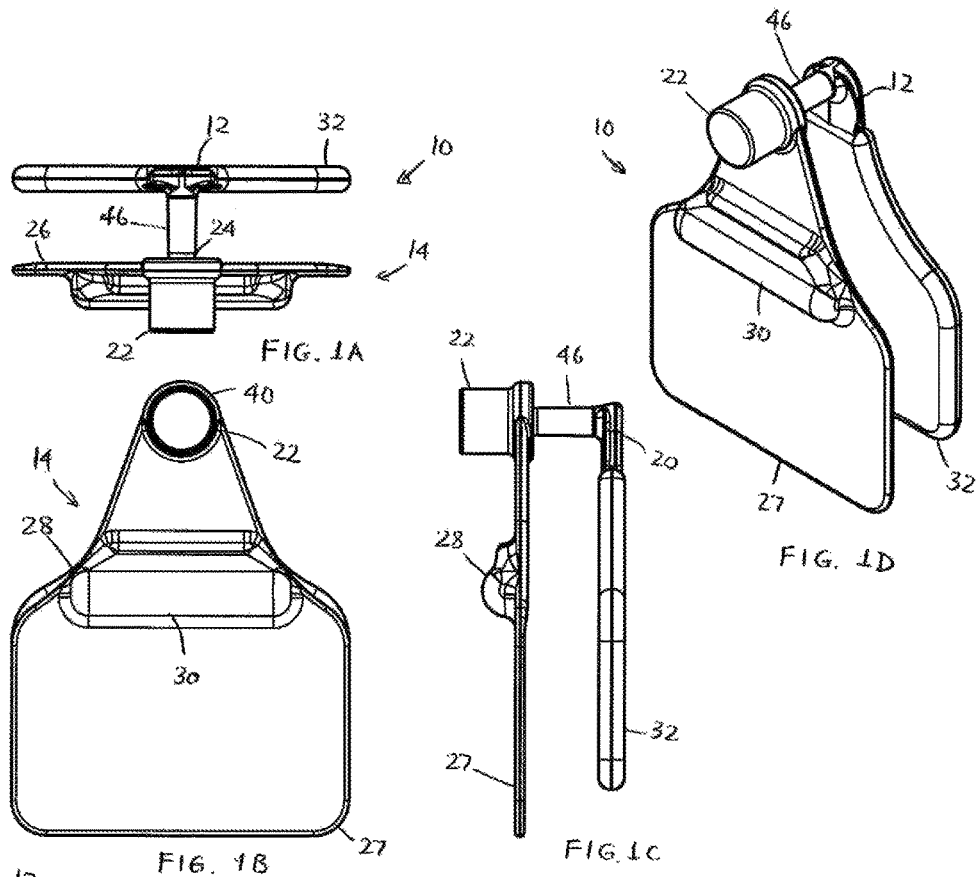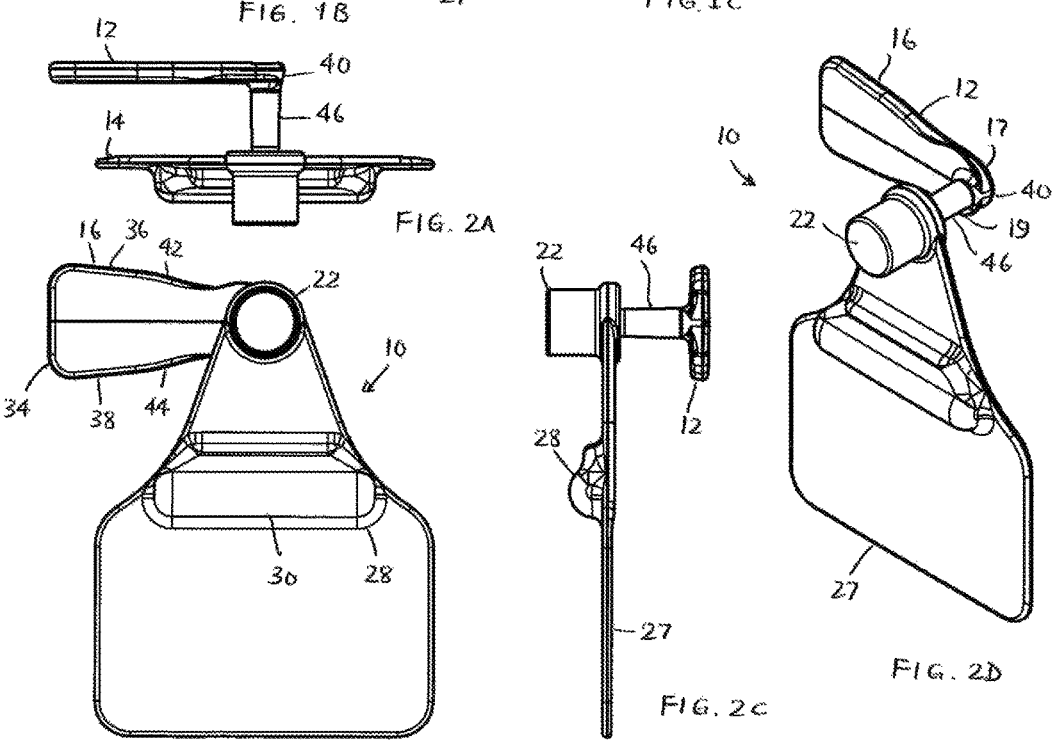

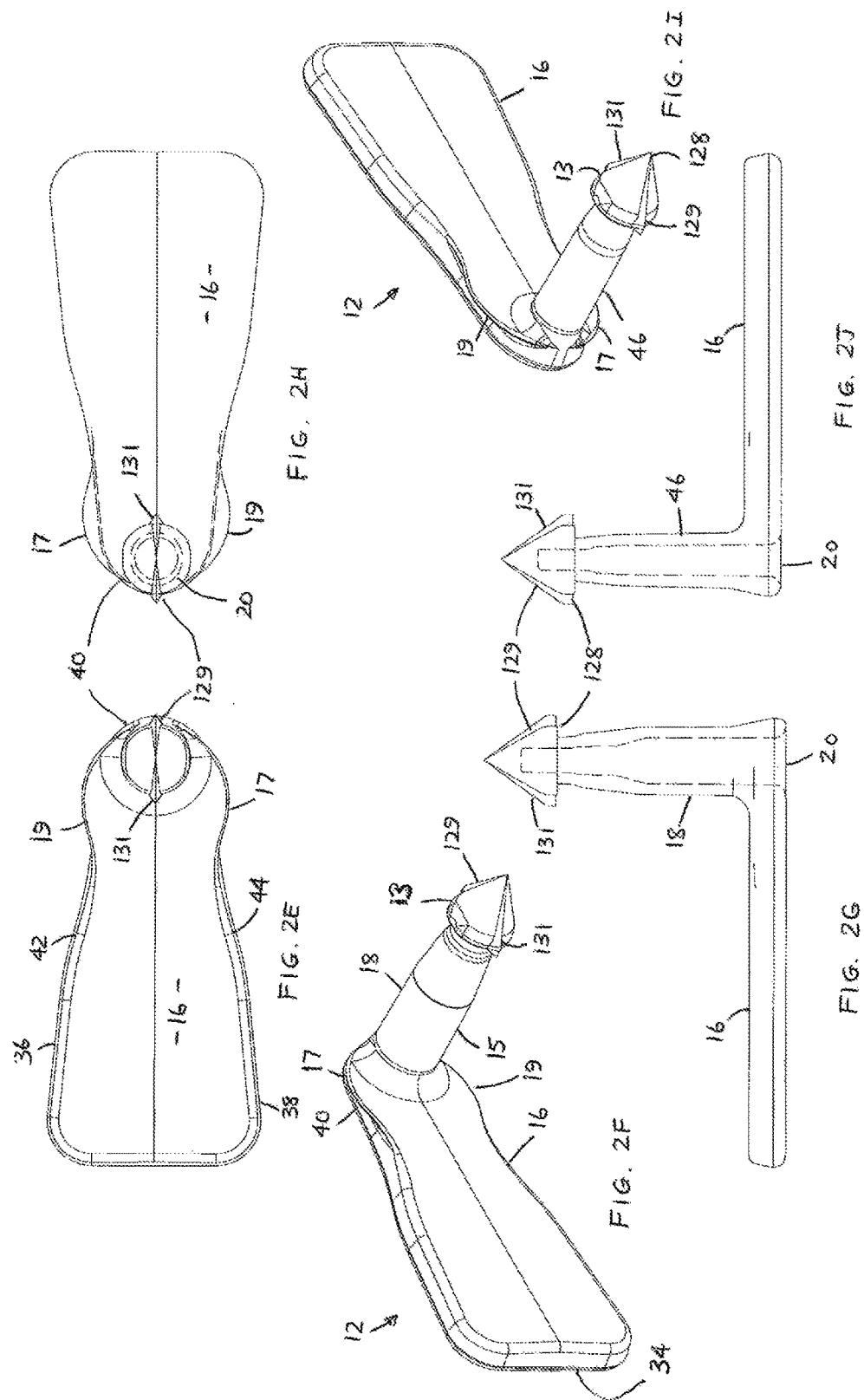

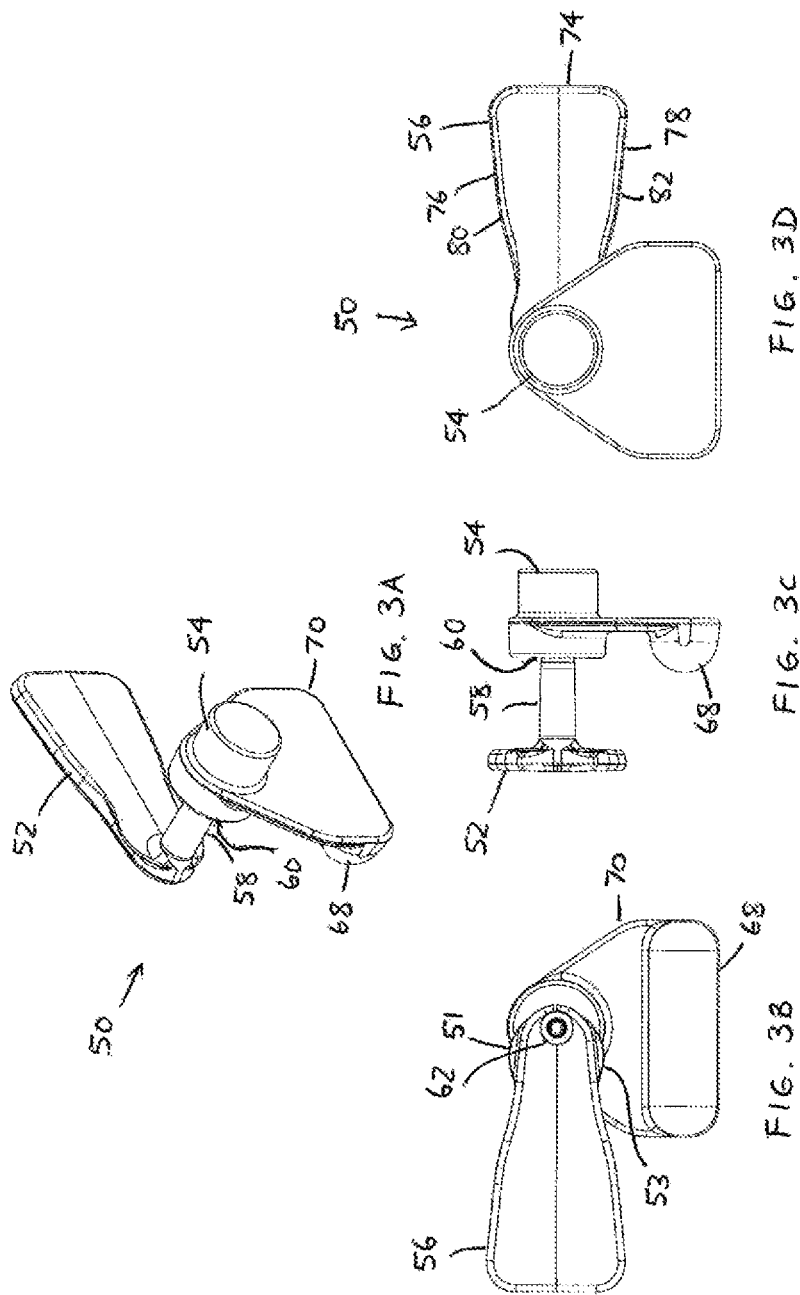

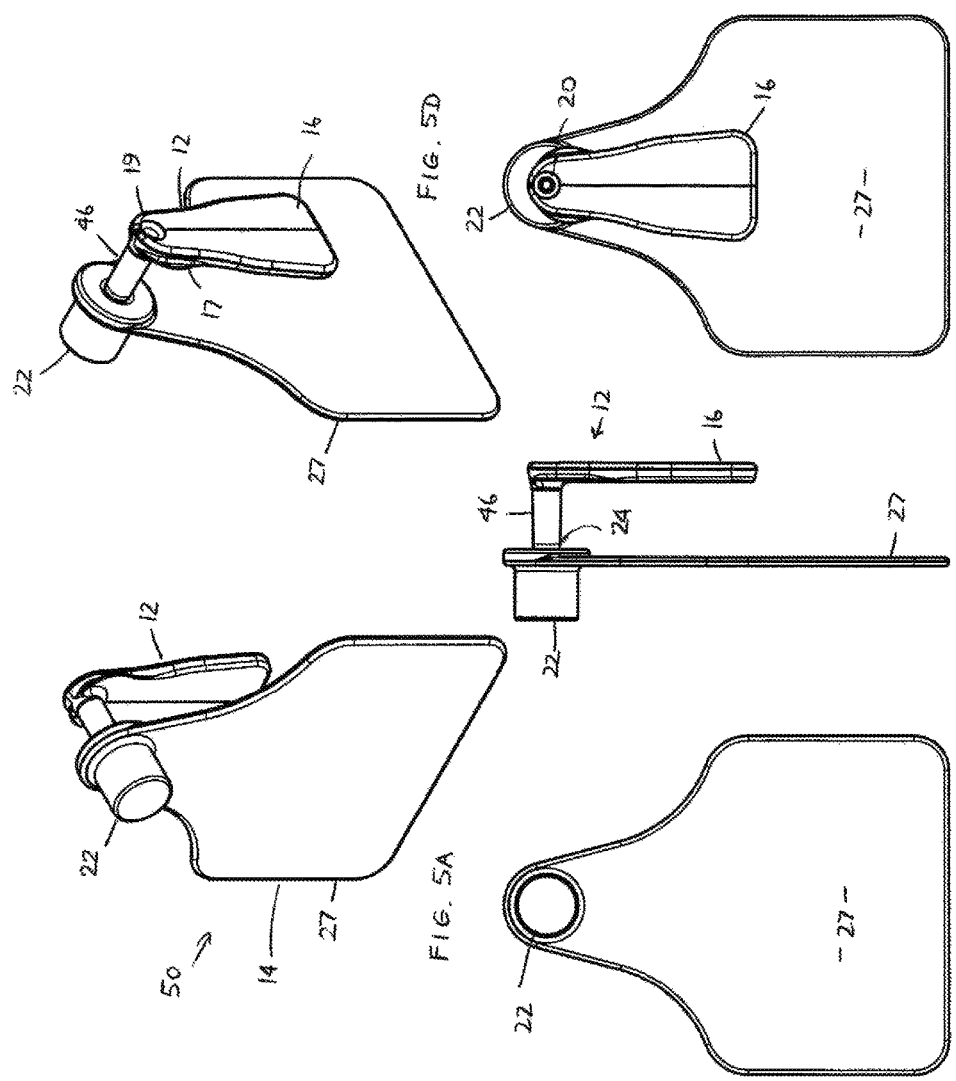

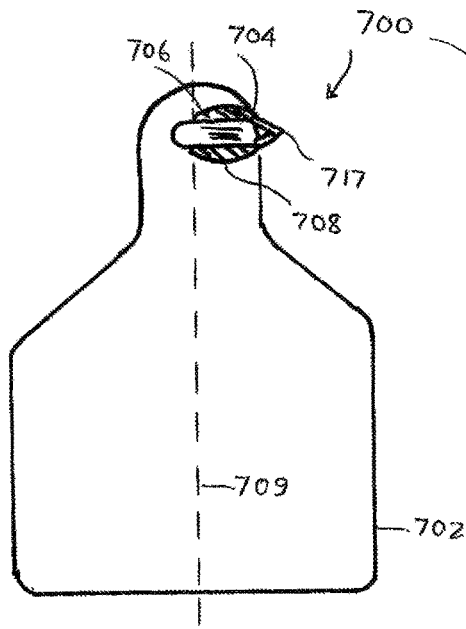
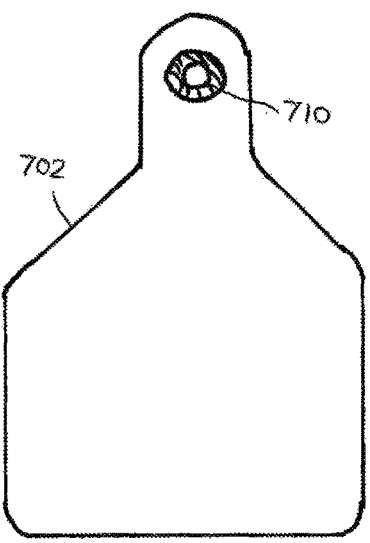
FIG. 7A  FIG. 7B
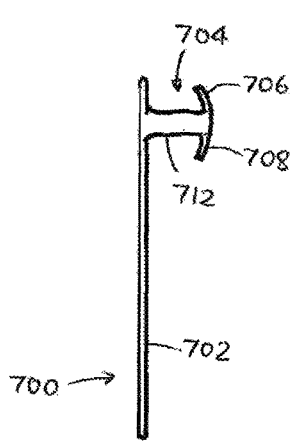
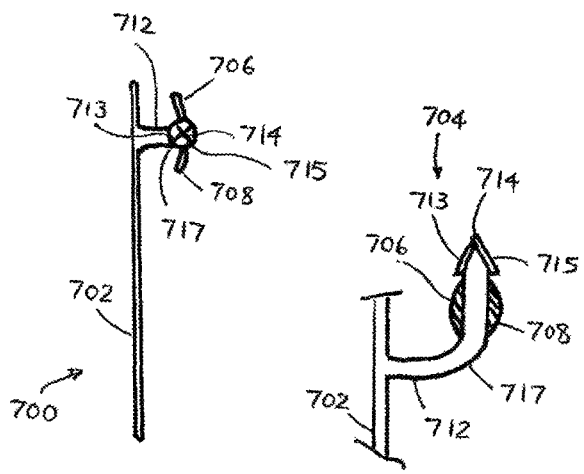
FIG. 7C  FIG. 7D  FIG. 7H

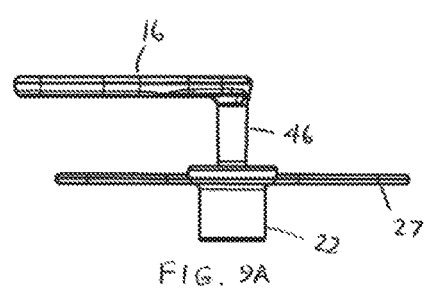
FIG. 9A
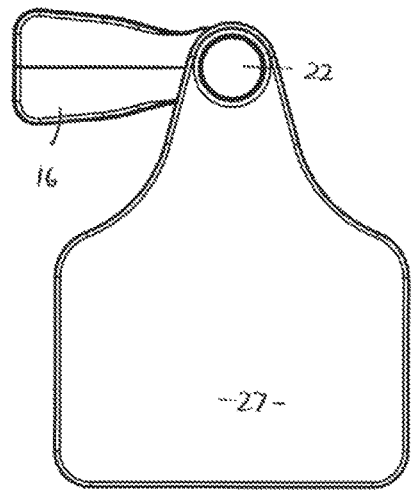
FIG. 9B
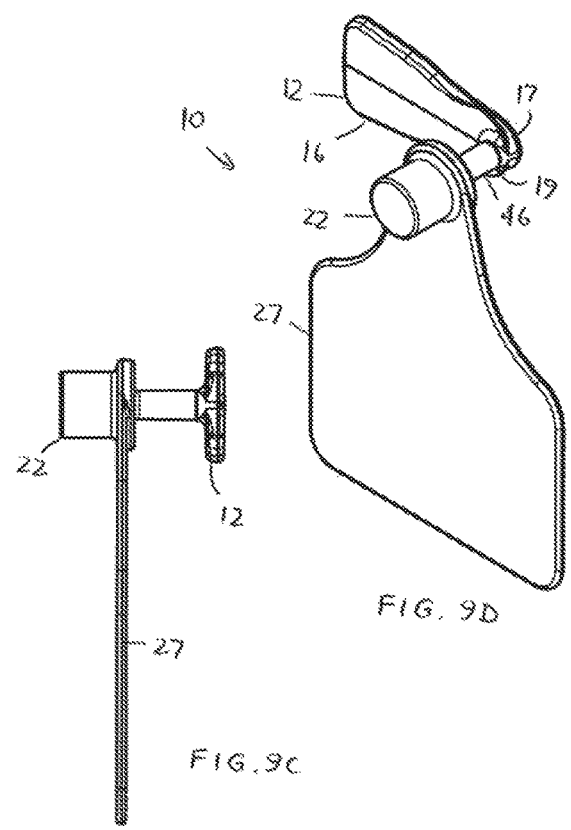
FIG. 9C
FIG. 9D
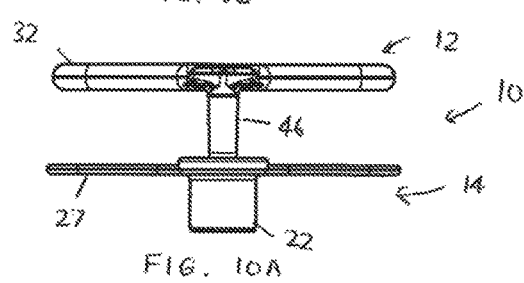
FIG. 10A
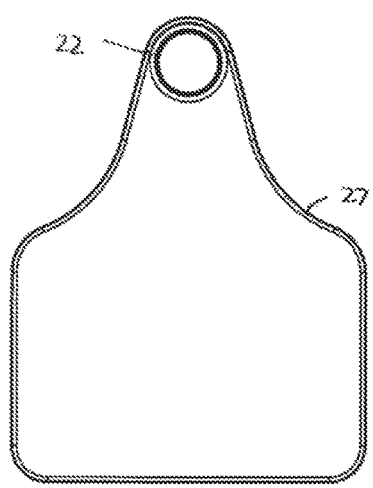
FIG. 10B
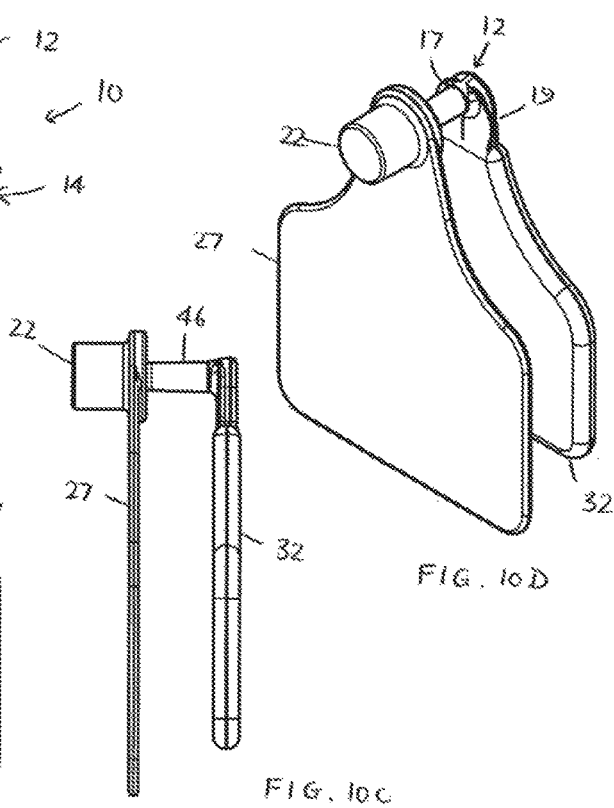
FIG. 10C
FIG. 10D

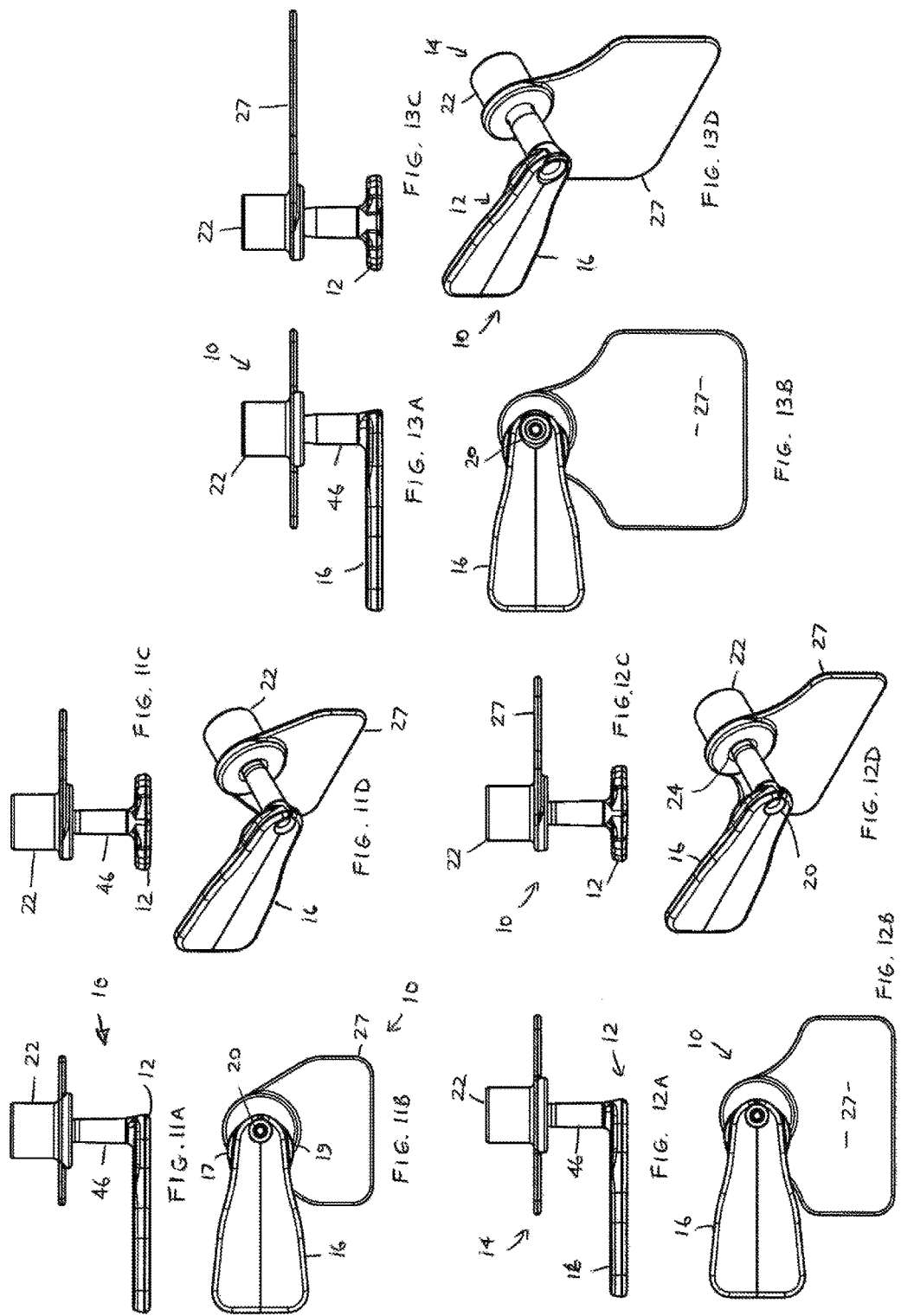

ANIMAL TAG

This application is a § 371 National Stage Application of PCT/AU2016/000183, which was filed on Apr. 22, 2016, and claims priority to Australian Application 2015901469, filed Apr. 24, 2015.

FIELD OF THE INVENTION

This invention relates to an animal tag and more particularly to an animal ear tag to enable whole of life identification of the animal and being of a shape which provides an effective snag-proof solution to prevent dislodgement from the animal's ear.

BACKGROUND OF THE INVENTION

In order to identify animals, such as cattle, sheep and goats, ear tags have been used for a number of years. Physical markings my be written or printed on a tag either alone or in addition to a transponder which is used to identify the animal when that animal is in range of a receiver for reading the information m the transponder.

However, due to the design of some of the ear tags where they protrude from the outer back or rear side of the ear, one or more surfaces of the tag can be caught by structures such as fencing, hay feeders, water troughs or wire mesh. Generally when the animals pull their heads back out from hay feeders or fences or similar structures, the structure creates pressure on the back of the ear and can then gain purchase on the tag or tag component position on the back surface of the ear, which then potentially leads to the tag components or tag, as in case of a single piece tag, being either pulled apart or the tags stay intact but rip the ear as the animal's head is withdrawn from the snagging structure Livestock cattle tags have an overhang adjacent an area where a penetrating member or prong meets the base portion of the male part of the tag. This effective overhang can confine the external structure which then exerts extreme pressure on the prong, often resulting in tag dislodgement. To minimise this snagging effect, these tags are manufactured using a soft flexible plastic (Polyurethane with Shore hardness of 95 A)) so the flange can often flex and release the snagging structure from under the flange of the male prong tag positioned on the back of the ear. However, industry has found that after several years of use in an animal's ear, the polyurethane tags weaken due to the nature of the softer plastic. The weakening of the plastic results in the stem or prong of these male tags to lessen their holding or tensile strength and more readily the stem breaks when pressure is applied, such as when the stem or prong is snagged or caught under the flange on an obstructing structure, such as fencing wire, hay feeders or bales. To overcome this industry problem with loss of animal identification due to poor tag retention, a harder more robust prong is required. However for this to retain the tag for long term retention or life retention, it must be resistant to snagging on structures. With the animal's tag being snagged by the wire for instance, this can do damage not only to the animal's ear but to the ear tag itself with a result that the identification, either physical or through the transponder being damaged, is lost or the transponder is destroyed.

Furthermore, in particular when ear-tagging goats, the skin in the ear of the goats can react negatively or over react to the presence of a tag. This tends to occur when the head of the penetrating member is about the same size or smaller than the diameter of the stem so that the hole that has been made in the ear by the head of the penetrating member is not larger than the stem diameter. These animals tend to be very sensitive to this type of tag and experience a reactionary healing process. A granulating wound can grow inside the ear along the prongs.

There is also a need to apply efficiently and quickly a number of tags to animals at once. One can take a great deal of time to tag one animal when each tag or the male penetrating member has to be placed in an applicator and then configured to fit a corresponding female portion, with the ear between the two. This in particular applies to sheep.

The present invention seeks to overcome one or more of the above disadvantages by providing an improved animal tag for use on various animals.

SUMMARY OF THE INVENTION

To achieve the above mentioned problems, the male tag and or tag component with its associated prong should have no effective overhang around the base of the single prong as it is positioned on the back of the animal's ear. This invention addresses these needs and combines snag proof design with male prong component plastic hardness (preferably Shore hardness of 70 to 90 D) and the male tag component positioning in the ear as the three elements to achieve whole of life tag retention.

According to a first aspect of the invention, there is provided tag apparatus for attachment to the ear of an animal including:

a male member with a stem and a penetrating head for penetrating the ear;

a portion that abuts against the back of the ear and cannot be pulled out of the ear, said portion having an end that is not directed towards the head of the animal when the apparatus is fitted to the ear;

such that when the apparatus is fitted to the ear, the apparatus has no overhanging material on which the animal can entangle the tag apparatus on a structure.

Preferably, the whole apparatus is made of a hard material having a Shore hardness of 70 to 95D and more preferably of 75 to 85D.

The apparatus may further include flange means for retaining the tag apparatus flush on the ear, said flange means being positioned against the back of the ear and behind the stem. The portion can move against the back of the ear in two directions of rotation between locations perpendicular to the longitudinal axis of the ear, said portion not having said end directed towards the head of the animal.

The member may be deformable such that after penetrating the ear the member or part thereof assumes a shape that retains an identifying means on the ear while not entangling or snagging the tag apparatus on the structure. The penetrating head of said member is preferably said portion and said portion extends towards a distal end of the ear and is positioned against the back of the ear. The penetrating head may be substantially in line with the front and rear edges of the ear and substantially in the middle of the ear.

The portion preferably includes a tail portion that is wider at a distal end thereof compared to a proximal end of the tail portion adjacent to a stem of said member, said proximal end being located nearer to a head of the animal than the distal end. The tail portion preferably tapers outwardly on opposed sides from the proximal end to the distal end of the tail portion. A second portion is preferably provided to receive said penetrating head and said second portion has means for identifying the animal. The identifying means is preferably a flag or flap on which indicia can be placed to identify the animal, said flag or flap generally hanging downwardly from the inside of the ear, said abutting portion being positionable between 0 degrees and 180 degrees with respect to a longitudinal axis of the ear of the animal with a distal end of the abutting portion not pointing towards the head of the animal.

The portion and the second portion are preferably integrally formed with a line of weakness formed therebetween. According to an embodiment, in use, the ear of the animal is placed between the first and second portions, the first portion is pivoted about the line of weakness and an applicator is used to force the member of the first portion through the ear and be retained in the receiving member of the second portion.

The first portion is preferably separated from the second portion along the line of weakness prior to insertion of the penetrating means through the ear. The penetrating head preferably has a pair of cutting edges that are used to cut the ear in two places to allow for the diameter of the stem and to allow the stem to sit relatively loosely inside the aperture made by the penetrating head in order to insert the tag or a portion of the tag through the ear.

According to an embodiment of the invention, there is provided a tag for attachment to the ear of an animal including:

a first portion having a penetration member for penetrating the ear of the animal;

a second portion having a receiving member for receiving and retaining said penetrating member, such that the a portion of the animal ear is located between the first portion and the second portion;

wherein the first portion has a tail with tapering sides such that the tail is wider at a distal end of the tail compared to a proximal end of the tail adjacent the penetrating member;

such that when fitted to the animal ear, the proximal end of the tail of the first portion is closer to the head of the animal than the distal end of the tail of the first portion, so that the animal does not entangle the tag on a structure.

BRIEF DESCRIPTION OF THE DRAWINGS

Preferred embodiments of the invention will hereinafter be described, by way of example only, with reference to the drawings, in which:

FIGS. 1A, 1B, 1C and 1D are respectively plan, front, side and perspective views of a tag apparatus for attachment to an animal's ear with a pair of flaps or flags according to a first embodiment of the invention;

FIGS. 2A, 2B, 2C and 2D are respectively plan, front, side and perspective views of the tag shown in FIGS. 1A to 1D but having only a single flap or flag used for identifying the animal;

FIGS. 2E, 2F and 2G are respectively underneath, perspective and side views of a male tag apparatus having a large diameter stem or prong;

FIGS. 2H, 2I and 2J are respectively plan, perspective and side views of a male tag apparatus having a smaller diameter stem or prong;

FIGS. 3A, 3B, 3C and 3D are respectively perspective, rear, side and front views of a tag apparatus to be fitted to a left ear according to a second embodiment of the invention;

FIGS. 5A, 5B, 5C, 5D and 5E are respectively front perspective, front, side, rear perspective and rear views of a tag apparatus according to a further embodiment of the invention with a single flag/flap fitted thereto and without a transponder;

FIGS. 7A and 7B show respectively rear and front views of a further embodiment of a tag apparatus;

FIGS. 7C and 7D are side views respectively of the rear and front views of FIGS. 7A and 7B;

FIG. 7H is a plan view of the tag apparatus of FIGS. 7A and 7B;

FIGS. 9A to 9D are views similar to FIGS. 2A to 2D and are respectively plan, front, side and perspective views of tag apparatus without an overmoulded third portion and without a transponder;

FIGS. 10A to 10D are views similar to FIGS. 1A to 1D and are respectively plan, front, side and perspective views of tag apparatus having a pair of flags, one of which is overmoulded over the male portion of the tag and also without a transponder housing; and FIGS. 11A to 11D, 12A to 12D and 13A to 13D are various views of tag apparatus suitable for all livestock with differently shaped flags attached.

DETAILED DESCRIPTION OF THE PREFERRED EMBODIMENT

Figure 4A:
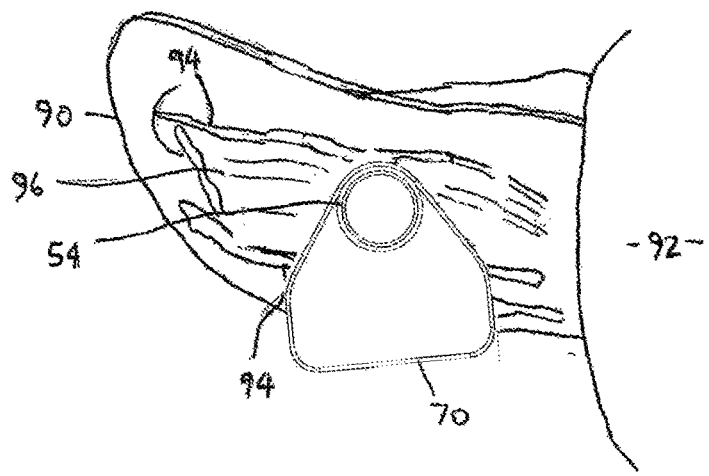
FIG. 4A is a front right ear view of an animal fitted with a tag apparatus according to the second embodiment of the invention.

Referring to FIGS. 1A to 1D, there are shown various views of an animal tag according to a first embodiment. This particular tag may be fitted to goats, pigs, calves but is more particularly useful for cattle. The tag 10 has a member or first portion 12 and a second portion 14. The first portion 12 has a stem 46 that forms part of a penetrating member 15, which penetrating member also has a head 13 (shown in FIG. 2F) adapted to fit into and be secured in receiving member 22 through aperture 24. The receiving member 22 is located at a periphery of the second portion 14 which has a transponder housing 28 for securing transponder 30 and a flag portion or flap 27 for visual identification of the animal. The transponder 30 and transponder casing 28 are optional. The penetrating member 15 of the first portion 12 has an aperture 20 to enable prongs of an applicator to protrude therein in order to apply the penetrating member 15 through the ear of an animal or another suitable body part of the animal. A further third portion 32, that acts as a flag, fits over a tail portion 16 of the first portion 12 and provides visual identification from the opposite direction to which the animal is facing. Thus physical identification is provided on flag 27 and 32 in both directions. The first portion 12 has a tail (or tag) portion 16 which has a distal end 34 (FIG. 2B), a pair of tapering sides 36 and 38 each of which taper to a curved end 40 adjacent the aperture 20 and stem 46. Each of the sides 36 and 38, being in the form of a ramp surface, have shoulders 42 and 44 where the sides 36 and 38 taper inwardly further from the shoulders 42 and 44 towards end 40. As can be seen more clearly in FIGS. 2A and 2D and 2E to 2J, there is no overhang of material around end 40 at the junction of the stem or prong 46 and tail or tag portion 16, which prevents any possible snagging of wire, for example. The tail portion 16 can be regarded as a portion that abuts the back of the ear.

Referring to FIGS. 2E to 2I, there is shown at end 40 a flange section made up of two flanges 17 and 19 formed on an underside of tail portion 16 adjacent the junction of stem 46 and portion 16. This enables the tail portion 16 to sit flat and spread against the outer or top surface of the ear of the animal to provide a platform that assists in keeping the tail portion in position. The flanges 17, 19 also prevent the male member 12 from being pulled out of the ear.

The first male portion 12, having stem 46, penetrating head 15 and tail portion 16 is made from hard plastics material being preferably Nylon 6 with a Shore hardness of between 70 and 95D, most preferably between 75 and 85D. Other existing tags and flags are generally made from polyurethane and are soft having a Shore hardness of about 95A. These existing tags over time decay and lose their strength and can easily be pulled out of the ear, snagged on wire damaging the tag and/or ear. As the portion 12 is a hard solid male member it can have cutting edges 129, 131 and very sharp point of penetrating head 128 of the same material which enables easing cutting and insertion through the ear.

Any wire or mesh that is near the ear will not be caught by the tag 10. Animals generally pull their head out backwardly from a wire fence, so that with the outer edge 34 of tail portion 16 positioned towards the outer edge of the ear and the stem nearer to the head of the animal, any wire will slide over the top of the tail portion 16 at end 40 and then the outer surface of tail portion 16, without having any part of the male member 12 being caught or snagged on the wire. Ideally the tail portion 16 is generally is in line with the longitudinal axis of the ear, but can still work in not getting caught in wire when it moves between the two positions perpendicular to the longitudinal axis of the ear. In other words, the tail portion 16 can hang downwardly (6 o'clock position relative to the longitudinal axis or move through the 3 o'clock position (parallel with outer edge 34 pointing to the outer ear edge) to the upward position (12 o'clock position with respect to the longitudinal axis. It will not operate effectively when the tail portion is located anywhere in the other 180 degree section closest to the head of the animal.

Shown in FIG. 1D is a flap or flag 32 made of soft plastics material (generally Shore hardness of 95A) provides additional identification of the animal from an opposite, behind position. Flap 27 provides space for indicia to identify the animal from the front of the animal. The flap 32 is overmoulded over the tail portion 16 of the first portion 12 and can move with the tail portion 16 if it swivels between the 180 degree positions mentioned above. Any wire that comes near the ear cannot catch or snag on the first portion 12 or flag 32 as there are no surfaces or crevices or recesses for the wire to catch. It will simply slide over the portion 12 or flag 32.

Dimensions for the flap or flag 27 (see FIG. 1B) are a width of 59 mm and length of 75 mm for large flags and up to a width of 74 mm and length of 100 mm with a printable height of 55 mm for very large flags. Larger or smaller widths and heights are possible.

In use, the open end of the stem 18 at aperture or bore 20 is placed in an applicator with the prong of the applicator protruding through the aperture or bore 20. The male penetrating head 128 then pierces or slices the back of the ear of the animal using for example cutting edges 129 and 131 shown in FIGS. 2E to 2I or 6A to 6C, adjacent where the ear meets the head of the animal and approximately in the middle of the ear. Effectively the cutting edges cut rather than puncture a hole in the ear, creating less pain and minimal wound for the animal. The edges are particularly useful for cutting open the ear so that a narrow stem, such as 46 (compared to a thicker stem 18 seen in FIG. 2G) can more easily penetrate the ear. The penetrating head 15 is made from hard plastics and the cutting edges or flanges 129, 131 are fine and thin. The penetrating head 128 of the penetrating member 15 is retained within receiving member 22 of second portion 14. The orientation of the tag 10 is generally as shown in FIG. 1B when the animal's face is facing towards the reader (out of the page) and the tag 10 is placed on the right ear. The tail portion 16 is generally positioned parallel to a longitudinal axis of the ear between the front and rear edges of the animal's ear but can be in other orientations as mentioned previously, while the flag 27 protrudes downwardly so that almost a 90° angle is formed between a longitudinal axis of the tail 16 and the second portion 14. The first portion 12 is generally fixed with respect to the second portion 14 and gravity essentially makes the second portion 14 hang downwards. The tag 10 set can swivel within the ear when both portions are locked together. Any other angle between 45° and 135° between the longitudinal axis of the tail 16 of the first portion 12 and a longitudinal axis of the flag 27 of the second portion 14 can be used to effect the anti-snag design functionality. Thus, the longitudinal axis of the second portion 14 (and flag where applicable) can be located at 45 to 135 degrees, with respect to longitudinal aids of the tail 16, if looking from the front of the animal. The main reason for having the tapered sides 36 and 38 and for having the smaller end 40 of the first portion 12, adjacent the head on the ear of the animal, is so that an animal is not caught up in any structure that could snag against the tag 10. Thus, for example, if an animal places its head through a wire fence and withdraws its head, any wire would slide against the sides 36 or 38 from the near end 40 along the sides 36 and 38 so that it is not caught up against the tail 16 portion. The distal end 34 has to be the nearest part of the tail 16 to the end or outer edge of the ear. At the proximal end 40, there is no overhang around the base of the stem 18 where it joins with tail portion 16, so that there is no possibility of snagging a wire or other object on the tag 10.

Referring to FIGS. 7A and 7B, there is shown respectively rear and front views of a further embodiment of an ear tag applied to animal ears. FIGS. 7C and 7D show respective side views of the tag of FIG. 7A. The tag 700 is of a single unitary construction including a flag 702, upon which indicia identifying the animal can be marked, and member or portion 704. Portion 704 is generally perpendicular to flag 702 prior to insertion into the animal's ear and has stem or prong 712 which is moulded with an elbow portion 717 (see FIG. 7H) and a penetrating head 714 (distal end) that has a pair of cutting edges 713, 715. The elbow stem portion 712 and elbow portion 717 is made of soft plastics and has perpendicular extensions or flanges 706, 708. The penetrating head 714 and associated cutting edges 713, 715 are made from hard plastics and is moulded to the softer plastic of the stem portion 712. In FIG. 7B there is shown lumen or cavity 710 of stem portion 712 into which is placed a pin of an applicator. On application of the pin against the animal's ear, such that the stem 712 and penetrating head 714 enter the skin from the inside of the ear, the head 714 pierces the skin and then the elbow portion 717 of the stem 712 resumes its manufactured state and is bent to approximately 90 degrees to a longitudinal axis 709 of the flag 702, as shown in FIG. 7A. This is able to be done due to the material that the stem 712 and extension elbow 717 are made from, being a soft and flexible plastics material, and in particular polyurethane. The whole stem 712 is pre-moulded to have a 90 degree bend in it. The pin of the applicator is able to straighten the whole stem 712 on application of the head 714 and stem 712 through the ear, and thereafter, upon withdrawal of the applicator pin, the stem 712 assumes its pre-moulded position and returns to having a bend in it, such that the penetrating head 714 is at about 90 degrees to axis 709 and therefore prevents any dislodgement of or damage to the tag 700. The penetrating head 714 and part of the stem 712 is moulded (folded) in tither direction, left or right, at 90 degrees to the flag 702. The stem 712 and head 714, on application by the applicator, fold to the right when looking from behind the right ear and fold to the left when looking from behind the left ear. Thus the tip of the penetrating head 714 must be pointing in a direction substantially parallel to the longer sides 730, 732 of the animal's ear 722 and point toward the outer portion or edge 719 of the ear 722. The penetrating head 714 and associated cutting edges 713, 715 are made from hard plastics and flanges 706, 708 are fine and thin, readily folded whilst penetrating the ear and made part of the stem system and made from softer flexible generally polyurethane plastics. Flanges 706, 708 assist in preventing the tag 700 from dislodging or going back through the opening in the ear.

Figure 7E:
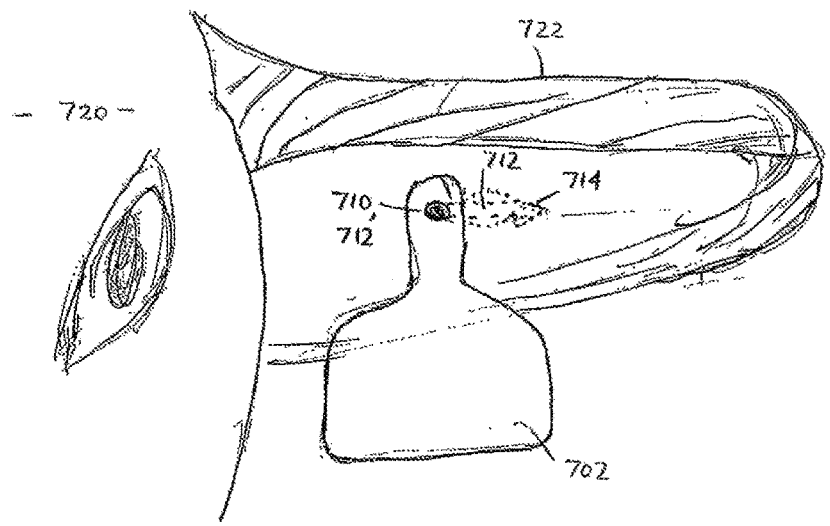
FIGS. 7E and 7F are respectively a front view of an animal's left ear and rear view of an animal's right ear fitted with the tag apparatus of FIGS. 7A and 7B.
Figure 7F:
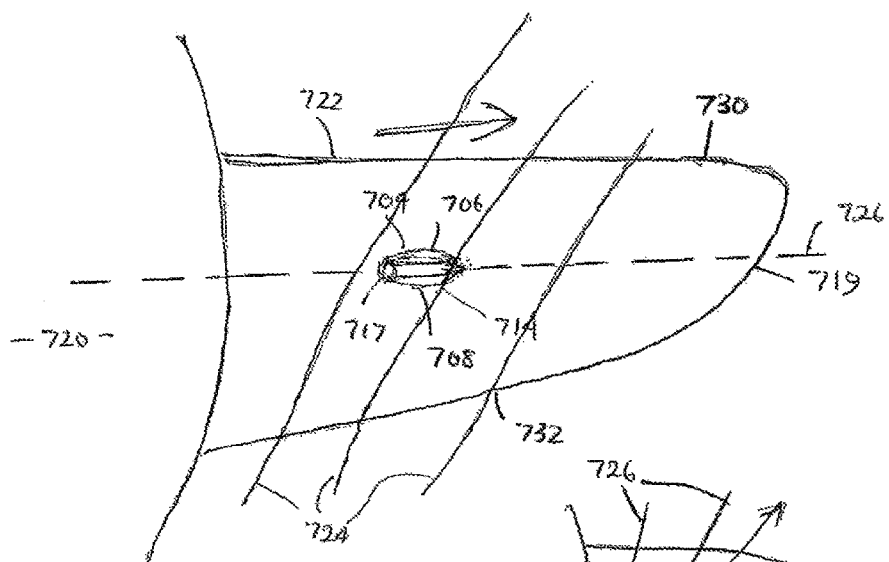
Figure 7G:
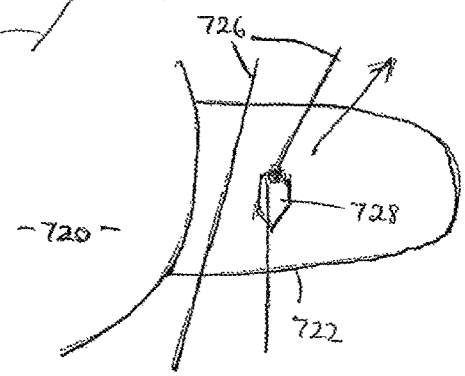
FIG. 7G is a view of an animal's ear fitted with a prior art tag that is snagged by wire.

FIGS. 7E and 7F show the tag 700 fitted to the animal's ear respectively from a front view of the left ear and rear view of the right ear. The flag 702 hangs down naturally, due to gravity, from the front of the ear 722. The stem 712 is positioned about the middle level of the ear but closer to the head 720 of the animal. As seen in FIG. 7F, the elbow stem 717 with end penetrating head (the point of the head 714) is pointing towards the outer edge 719 of the ear 722 and is substantially parallel to the longitudinal or horizontal axis 726 of the ear 722. There is no overhang material around the stem 712 for wire 724 or the like to wedge against. The wire 724 simply passes over the portion 704 of tag 700. Thus when the animal pulls its head back through fencing wire, gates or tree guards, there is no overhang on the tag upon which the animal's tag can get snagged. As with some prior art systems, referring to FIG. 7G, other tags like 728 can be snagged by wire 726 underneath a folded stem and flange when the stem portion of tag 728 is placed in a vertical orientation. Pressure can then snap the tag components apart at the stem or the tag or wire can forcefully tear the ear, both of which result in lost or damaged tags.

FIGS. 2A to 2D show various views of the tag 10 of FIGS. 1A to 1D, without the additional third portion 32. Furthermore the stem 46 in this embodiment is narrower than the stem 18 of FIGS. 2E to 2G. Stem 46 is used on ears of small livestock, such as goats and sheep with cutting edges or blades on the penetrating head at the distal end of the stem, while stem 18 is thicker and used on larger livestock such as cattle. Some animals, such as goats, have a reaction when a large prong or stem of the male penetrating member is equal to or larger than the diameter of the penetrating head that pierces the skin of the ear of the animal. Thus when the cut hole is not larger than the stem diameter, the goat's skin tends to react to the tightness of the stem within the ear. It is found that by creating a larger hole in the ear, that is, a much larger penetrating head compared to the diameter of the stem, the animal suffers minimal pain and the skin over time heals effectively without excessive reaction. Therefore, initially the hole in the ear created by the penetrating head will be larger than the diameter of the stem and eventually the skin stretches and grows around the stem.

Referring to FIGS. 3A to 3D there is shown various views of a tag 50 that is particularly suited to goats, alpacas and other livestock. It consists of a first portion 52 having a male penetrating member with stem 58 and a second portion 54, which is a receiving member for receiving and retaining stem 58. The tag can be applied to either the left or right ear. The first portion 52 has a tail portion 56 having ramped or tapering sides 76 and 78 with an outer or distal end 74. Shoulders 80 and 82 are at approximately the midway point of respective sides 76 and 78. A transponder housing 68 is shown in FIG. 3B which houses a transponder (not shown) for providing identification of the animal. An extended portion or flag 70 is used to fit the transponder housing 68 and enable indicia to be placed thereon for identification of the animal. Flanges 51 and 53 are similar to flanges 17, 19 described in FIGS. 2E to 2I.

In use, the penetrating member at the distal end of the stem 58 pierces the animal's ear and is then received in aperture 60 of receiving member 54 with the ear placed between the tail portion 56 of the first portion 52 and the second portion 54. This is done by use of an applicator where one of the prongs of the applicator is inserted into the aperture 62 of stem 58. The stem 58 is of a narrow diameter compared to the diameter of the penetrating head to assist in the healing and growing process as described above in relation to goats.

Figure 4B:
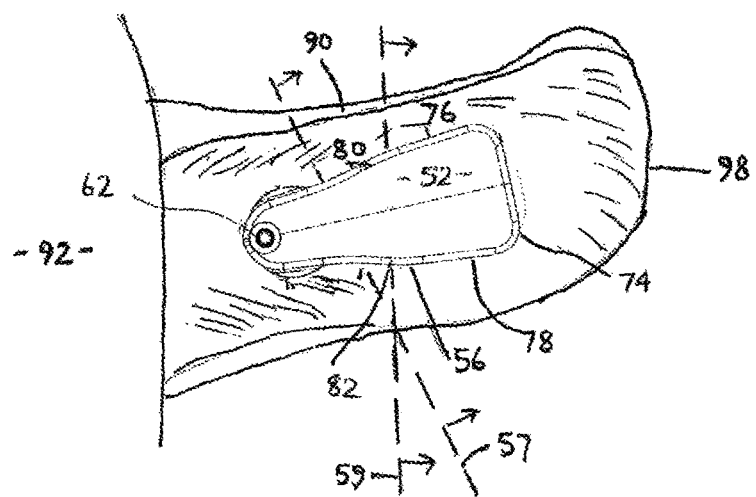
FIG. 4B is a rear or back view of the ear of the animal in FIG. 4A fitted with a tag apparatus according to the second embodiment of the invention.

The tag 50 is shown as applied to the right ear of the goat in FIGS. 4A and 4B. FIG. 4A shows the underneath part of the right ear 90 of a goat while FIG. 4B shows the top side or back side of the right ear 90 protruding from the head 92 of the goat. Shown in FIG. 4A are a series of ridges 94 which are raised and may or may not contain veins. Inside a recess 96 formed between a pair of the ridges 94, the second portion 54 snugly fits and is retained by the ridges 94. In FIG. 4B, it is seen that the tail portion 56 is substantially parallel to the longitudinal axis of the ear 90 with the distal end 74 nearest to the outer side 98 of ear 90. The piercing through the ear 90, where receiving member 54 is positioned, is shown substantially in the middle of the ear closest to the head 92. This is the ideal position. Any wire, such as 57 or 59 shown in dotted lines in FIG. 4B, that the goat comes across, (and that moves in the direction of the arrows shown) for example in a fence or a mesh structure, will not be able to snag underneath the end 74 but instead will contact either sides 76 or 78 and slide against those sides or on the top outer side of tail portion 56.

Shown in FIGS. 5A to 5E of a tag 50 having a first male member or portion 12 with a stem 46 and penetrating head (not shown) received by receiving member 22. The portion includes a tail portion 16. The receiving member 22 is formed with a flag 27 and the tail portion 16 is shown in a downwardly hanging position (at the 6 o'clock position referred to earlier). In the position that the tail portion 16 is shown, no wire or other structure cm dislodge or snag on the portion 16. The portion 16 flicks or moves away by rotating in response to the force of the wire moving across or against the portion 16 and is aided by the contours of flanges 17, 19. If the third portion 32 was attached or overmoulded over the tail portion 16, this would also simply move or rotate in response to the contact with a wire.

Figure 6A:
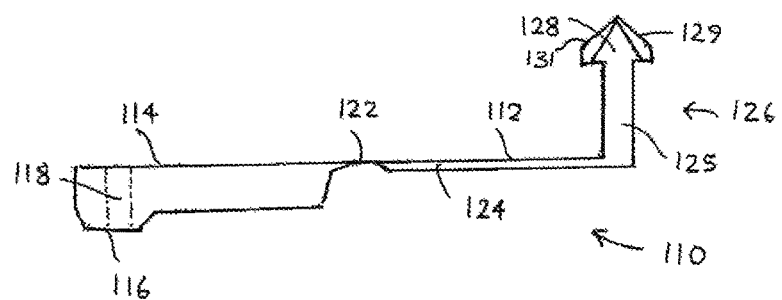
FIG. 6A is a front view of an integrally formed ear tag according to a third embodiment of the invention with a first portion fully open with respect to a second portion ready for use.
Figure 6B:
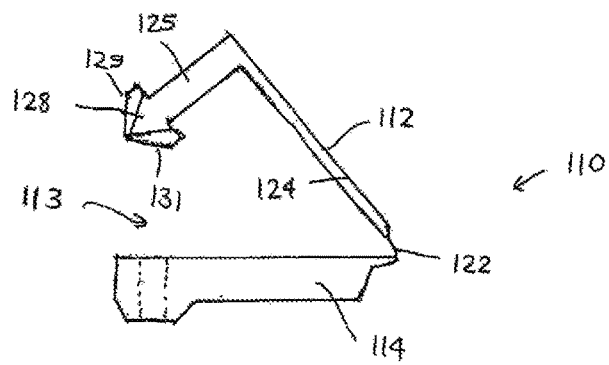
FIG. 6B is a front view of the ear tag of FIG. 6A with the first male portion ready for insertion into the second female portion.
Figure 6C:
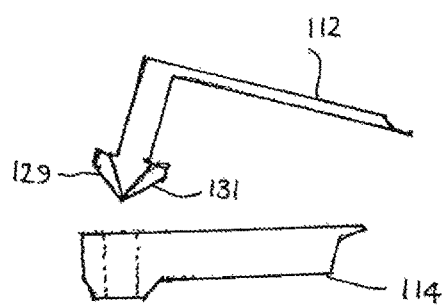
FIG. 6C is a front view showing the first and second portions of the tag of FIG. 6A separated.

With reference to FIGS. 6A to 6C, there is shown a further embodiment of the tag, in this case, tag 110 formed of a first portion 112 and a second portion 114, prior to being applied to an animal. The tag 110 can be integrally moulded as a single unit and has a point or line of weakness 122 between the two portions 112 and 114 or can be moulded as two separate parts, being a locking section and a penetrating portion. Portion 112 has a stem 125 of penetrating portion 126 with a penetrating head 128 having cutting edges 129 and 131 and section 124 (which can be a tail with tapering edges). Second portion 114 has receiving member 116 and corresponding bore 118 and optionally a transponder. In use the first portion 112, as seen in FIG. 6B, is folded bark towards portion 114 with the animal's ear or other skin portion positioned in the gap 113 between the portions 112 and 114. An applicator (not shown) is used to apply the stem 125 and cutting edges 129, 131 on the penetrating head 128 through the animal's skin and the penetrating head 128 is then retained by receiving member 116. Prior to applying the tag 110 to the animal, the line of weakness 122 ruptures (either done by hand or within the applicator or a cassette) and creates two separate pieces, being the portions 112 and 114, as seen in FIG. 6C. Thus, the applicator now has two single pieces of the tag 110. The stem 125 and its penetrating head 128 are then applied to pierce the ear and the head 128 locks into and is engaged by the receiving member 116. As before, the tag 110 is applied parallel to the longitudinal axis of the ear, so that no overhang is present on the back of the ear upon which wire or mesh can snag. The stem 125 is placed closest to the ear base near the head of the animal. The stem 125 and penetrating head 128 may be flexible as described in relation to FIGS. 7A and 7B and can be a one piece tag with transponder embedded. This provides a much easier manner in which to integrally mould the tag 110, which could be one of many that are formed integrally and are broken off, one by one, when they are required for use. Thus they can be formed as a cartridge where a further line of weakness or tear line can be used to tear one tag 110 away from the remainder of the tags in the cartridge. The transponder used in this tag is typically up to 23 mm in length, does not need to be encapsulated and can be positioned in the tag either during or after the moulding process, but preferably after the moulding process. This particular tag 110 is suitable for sheep but can be extended for use with other animals. The penetrating head 128, with its cutting edges 129, 131 are used to cut the ear in two places to allow for the diameter of the stem 125 and to allow the stem 125 to sit relatively loosely inside the aperture made in the ear in order to insert the tag or a portion of the tag through the ear.

Figure 6D:
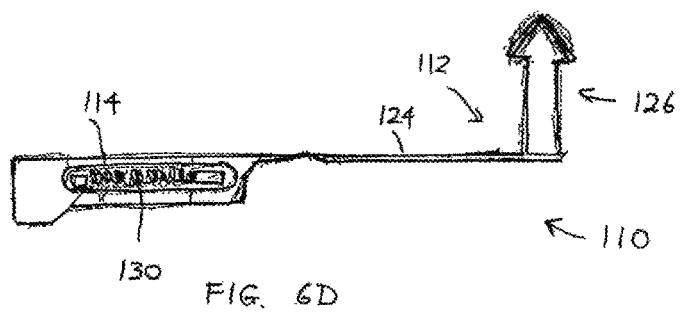
FIG. 6D is a front view similar to FIG. 6A including a transponder in the second portion.

FIG. 6D shows the tag 110 having a transponder 130. A visual tag could also be used. The tag 110 can be manufactured with the transponder 130 therein as an over-mould process, surrounded by a capsule, or alone without a capsule around the transponder 130, as in the case shown in FIG. 6D. The transponder can be inserted into a cavity after the manufacturing process.

Figure 8A:
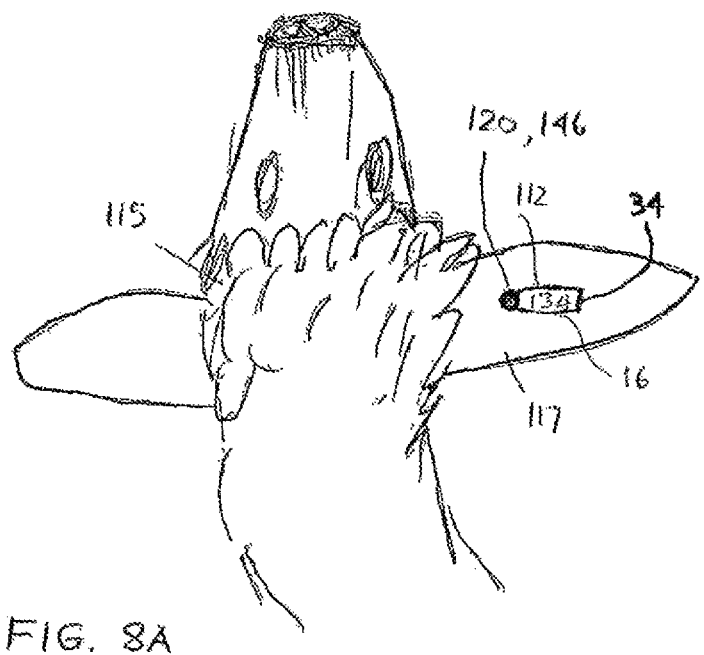
FIG. 8A is a view of a sheep's right top (back) ear having a tag fitted thereto.
Figure 8B:
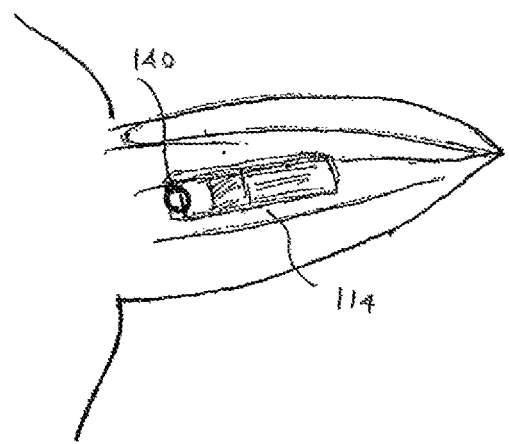
FIG. 8B is a view of a sheep's inside or front part of the ear with the tag of FIG. 8A fitted thereto.

FIG. 8A is a plan view of a sheep's head 115 with the top of the right ear 117 having the male portion 112 (or first portion 12 with tail 16 portion) parallel to a receiving or locking portion 114 with the point of the outer distal edge 34 pointing to the outer, distal edge of the ear. The lumen or cavity 120 of stem 146 of the male portion 112 for receiving a pin of an applicator is positioned close the head of the sheep and adjacent the middle of the ear between the front and rear longitudinal edges of the ear. In FIG. 8B there is shown the underneath or inside view of the ear with the receiving or locking portion 114 (without flag) parallel to the length of the ear 117 and the locking part, that is where the stem protrudes through the ear at 140 and locks into portion 114, closest to the base of the ear. It is seen that there is no overhang around the stem and where it meets the tail portion 16 and up to 270 degrees of rotation of the tail portion is possible without being snagged on wire.

Referring to FIGS. 9A to 9D, there is shown another embodiment of a tag 10 without a transponder casing and without a third portion 32 (see FIG. 1D). The flanges 17, 19 prevent the tag from being pulled through the ear if pressure is created on the female tag component as only occasionally happens. The flanges 17, 19 assists in stopping the tag pulling through in the case when the hole in the ear enlarges over time.

FIGS. 10A to 10D show an alternative arrangement of a tag 10, similar to the tag of FIGS. 1A to 1D, but without the transponder easing and transponder.

FIGS. 11A through to 13D show various views of embodiments of the invention with a first male portion in a receiving portion and types and numbers of flags fitted.

The invention claimed is:

1. A tag apparatus for attachment to an ear on a head of an animal, comprising:
   a male member with a stem and a penetrating head for penetrating the ear;
   a first portion made of hard plastics material that abuts against a back of the ear and cannot be pulled out of the ear, said first portion having a distal end that is not directed towards the head of the animal when the apparatus is fitted to the ear;
   wherein the stem abuts with or is integral with the first portion at a junction with the proximal end of the first portion;
   wherein there is no overhanging material at the junction of the stem and the first portion, the first portion being of a shape such that when the first portion is in contact with a structure, the structure is unable to be entangled with the first portion;
   further wherein upon such contact with said structure, the first portion is able to move between a first position and a second position to prevent entanglement with the structure.

2. The tag apparatus of claim 1, further wherein the tag apparatus is made in whole or in part of a hard material having a Shore hardness of 70 to 95D.

3. The tag apparatus of claim 1, further wherein the tag apparatus is made in whole or in part of a hard material having a Shore hardness of 75 to 85D.

4. The tag apparatus of claim 1, further comprising a flange positioned against the back of the ear and behind the stem, wherein said flange is adapted to retain the tag apparatus flush on the ear.

5. The tag apparatus of claim 1, further wherein the first portion is moveable against the back of the ear in two directions of rotation between locations perpendicular to a longitudinal axis of the ear, said first portion not having said end directed towards the head of the animal.

6. The tag apparatus of claim 1, further wherein said male member is deformable such that, after penetrating the ear, the male member or part thereof assumes a shape that retains a tag or identifying means on the ear while not entangling or snagging the tag apparatus on said structure.

7. The tag apparatus of claim 6, further wherein the penetrating head of said male member is said first portion, and said first portion extends toward a distal end of the ear and is positioned against the back of the ear.

8. The tag apparatus of claim 7, further wherein the penetrating head is substantially in line with the front and rear edges of the ear and substantially in the middle of the ear.

9. The tag apparatus of claim 1, further wherein said first portion includes a tail portion that is wider at a distal end thereof compared to a proximal end of the tail portion adjacent to a stem of said male member, said proximal end being located nearer to the head of the animal than the distal end.

10. The tag apparatus of claim 9, further wherein the tail portion tapers outwardly on opposed sides from the proximal end to the distal end of the tail portion.

11. The tag apparatus of claim 1, further wherein a second portion is provided to receive said penetrating head, said second portion comprising means for identifying the animal.

12. The tag apparatus of claim 11, further wherein the identifying means comprises a flag or flap on which indicia can be placed to identify the animal, said flag or flap generally hanging downwardly from the inside of the ear, said first portion being positionable between 0 degrees and 180 degrees with respect to a longitudinal axis of the ear with a distal end of the first portion not pointing towards the head of the animal.

13. The tag apparatus of claim 12, further wherein the first portion and the second portion are integrally formed with a line of weakness formed therebetween.

14. The tag apparatus of claim 13, further wherein, in use, the ear of the animal is placed between the first portion and second portion, the first portion is pivoted about the line of weakness, and an applicator is used to force the male member of the first portion through the ear and be retained in a receiving member in the second portion.

15. The tag apparatus of claim 14, further wherein the first portion is separated from the second portion along the line of weakness prior to insertion of the penetrating male member through the ear.

16. The tag apparatus of claim 1, said penetrating head comprising a pair of cutting edges adapted to cut the ear in two places to create an aperture of sufficient diameter relative to the stem to allow the stem to sit relatively loosely inside the aperture when inserting the tag apparatus or portion thereof through the ear.

17. A tag for attachment to an ear of an animal, comprising:
- a first portion made of hard plastics material comprising a penetrating member adapted to penetrate the ear of the animal;
- a second portion comprising a receiving member adapted to receive and retain said penetrating member, such that a portion of the animal ear is located between the first portion and the second portion;
- wherein the first portion comprises a tail with tapering sides such that the tail is wider at a distal end of the tail compared to a proximal end of the tail adjacent a junction with the penetrating member, wherein the penetrating member abuts with or is integral with the tail at said proximal end;
- wherein there is no overhanging material at the junction of the penetrating member with the proximal end of the tail of the first portion, the first portion being of a shape such that when the first portion is in contact with a structure, the structure is unable to be entangled with the first portion;
- further wherein upon such contact with said structure, the first portion is able to move between a first position and a second position to prevent entanglement with the structure.

* * * * *